United States Patent [19]

Sandler et al.

[11] Patent Number: 5,590,185

[45] Date of Patent: Dec. 31, 1996

[54] MULTIPLE PHONE LINE ADAPTOR

[76] Inventors: Harold Sandler, 18607 Aceituno St., San Diego, Calif. 92128; Kendy Ip, Rm D, G/F, BLK 6, The Eldorado, Tong Yan San Tsuen, Yuen Long, Hong Kong

[21] Appl. No.: 409,225

[22] Filed: Mar. 25, 1995

[51] Int. Cl.$^6$ ................................................. H04M 1/00
[52] U.S. Cl. ..................... 379/163; 379/164; 379/373; 379/386
[58] Field of Search ..................... 379/399, 163, 379/164, 156, 373, 376, 377, 162, 214, 393, 215, 202, 167, 171, 172, 173, 165, 386

[56] References Cited

U.S. PATENT DOCUMENTS

| | | | |
|---|---|---|---|
| 5,283,825 | 2/1994 | Druckman | 379/167 |
| 5,317,631 | 5/1994 | Chen | 379/233 |
| 5,408,525 | 4/1995 | Eldering | 379/165 |

*Primary Examiner*—Krista M. Zele
*Assistant Examiner*—Jacques M. Saint-Surin
*Attorney, Agent, or Firm*—John P. Sumner

[57] ABSTRACT

The present invention is a two line phone adaptor that allows two separate phone lines to be connected to and controlled by a single line DTMF phone. The two line phone adaptor has one ring detector for each line and one hold circuit for each line. The adaptor also has an electronic line selector circuit, a DTMF decoder and an off hook detector. All of the above circuits are connected to a micro controller that contains the software that defines the functions of the adaptor. The adaptor does not have any user accessible control buttons except for an on/off switch. The adaptor will automatically engage the 'ringing line' and transfer the ring signal to the attached phone to generate an audible ringing sound. When the phone is taken off the hook, the adaptor will automatically seize a 'free line' for use. The adaptor is controlled by the 3×4 keyboard of the attached DTMF single line phone and provides the functions such as music on hold, manual line select and three party conferences.

14 Claims, 5 Drawing Sheets

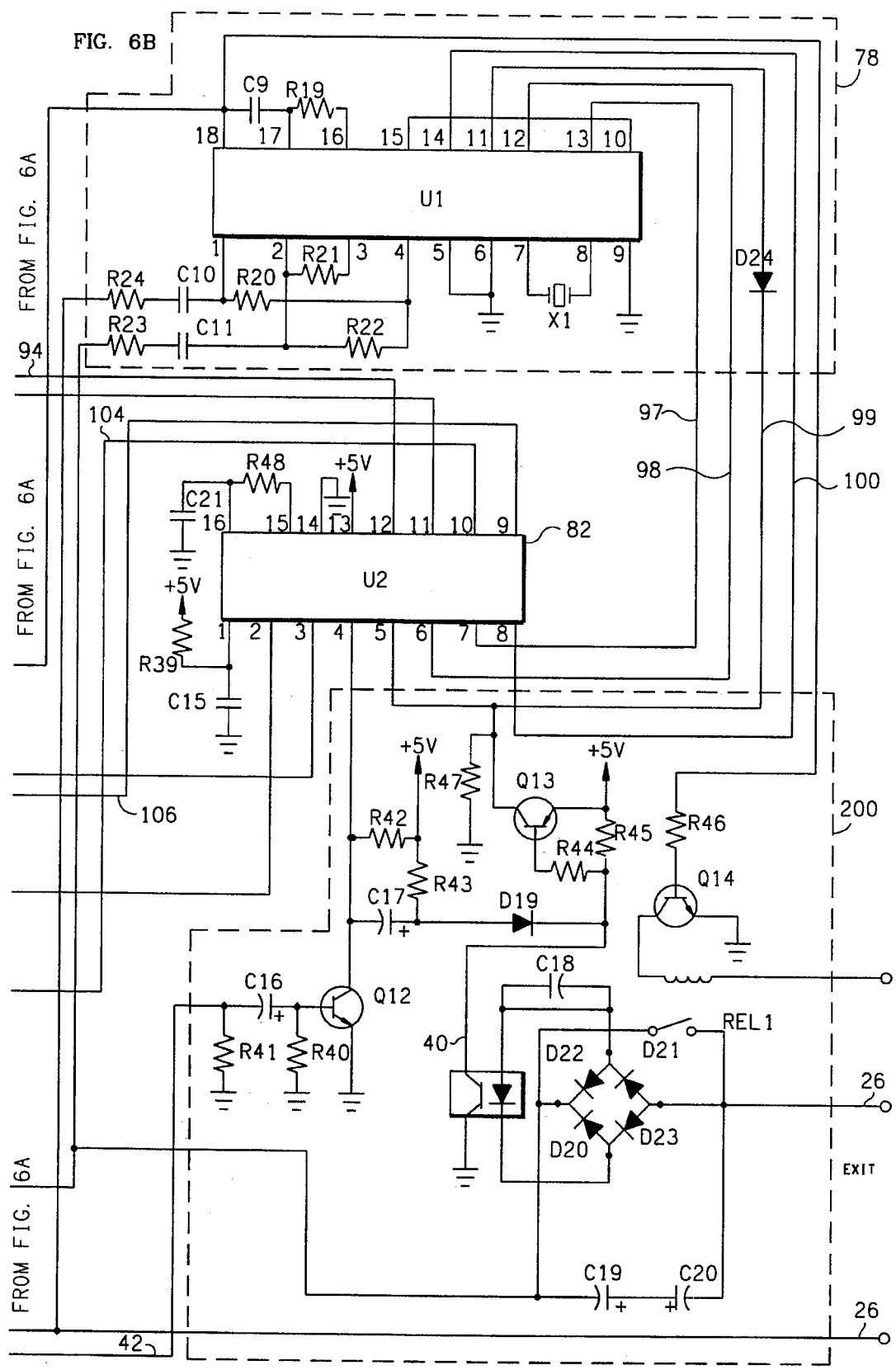

MULTIPLE PHONE LINE ADAPTOR

FIELD OF THE INVENTION

The invention relates to a switching device for connecting two or more separate phone lines to a single phone that does not have multiple line capability. The switching device is responsive to DTMF (Dual Tone Multiple Frequency) dialling control signals from the phone and to ring signals from two or more phone lines.

BACKGROUND OF THE INVENTION

There are millions of single line phone in use throughout the world. These phones are not capable of being connected to more than one phone line at a time. Without the expense of buying a new dual or multiple line phone, many people would like to have the ability of using their existing single line phone to connect to multiple phone lines at the same time. This convenience would allow the conversion of a single line phone to a multi-line phone that would be capable of making conference calls, putting a call on hold with music while making a second call, answering a second line or selecting a phone line on which a call is to be made. Currently there is no device on the market that allows a phone user to add a second or third line to their home or office and to connect all of the lines to an existing single line phone while at the same time having incoming calls on all lines recognized by the single line phone user who controls the selection of incoming calls. Such a convenience would thus allow a single line phone owner to have all the convenience of a multi-line phone without purchasing one. It would also be an advantage if there was an adaptor for connecting multiple separate phone lines to a single line phone that was battery operated thereby eliminating the need for a transformer. Such a device would have to have low power consumption so that the batteries could provide many months of continuous service before replacement was necessary.

SUMMARY OF THE INVENTION

The present invention is a multiple line phone adaptor that allows two or more separate phone lines to be connected to and controlled by a single line DTMF phone. The present invention is discussed in the context of a two line phone adaptor, however the invention is not limited to connecting two separate phone lines to a single line phone as the invention encompasses connection of a single line phone to two or more phone lines. The two line phone adaptor has one ring detector for each line and one hold circuit for each line. The adaptor also has an electronic line selector circuit, a DTMF decoder and an off hook detector. All of the above circuits are connected to a micro controller that contains the software that defines the functions of the adaptor. The adaptor does not have any user accessible control buttons. The adaptor will automatically engage the 'ringing line' and transfer the ring signal to the attached phone to generate an audible ringing sound. When the phone is taken off the hook, the adaptor will automatically seize a 'free line' for use. The adaptor is controlled by the 3×4 keyboard of the attached DTMF single line phone and provides the functions such as music on hold and manual line select. Commands such as ## are used to switch to another line, ** to hold the current line, *1 to switch to line 1, *2 to switch to line 2 and *0 to identify the current line being used (this feature is used when one is engaged on a call to confirm the phone line being used—a one beep response indicates line 1 is in use and a two beep response indicates line 2 is in use). When not in use the adaptor goes into sleep mode to conserve power. When a line rings or the phone is taken off the hook the adaptor 'wakes up' and uses approximately 15–50 mA depending on the functions used. In sleep mode the adaptor uses less than 50 uA which extends the battery life to several months. The adaptor can also be powered by an AC fed power supply.

The multi line adapter can function on any phone network and is compatible with any existing phone company services such as call waiting, conferencing, call forwarding and call ID etc.

It is an object of the present invention to provide a multiple line phone adaptor that allows connection of two or more separate phone lines to a single line DTMF phone.

It is another object of the invention to provide a multiple line phone adaptor that allows a single line DTMF phone to have conference calling, hold capability, automatic or manual line selection and the ability answer a second line while the user is on the first line.

It is a further object of the invention to provide a multiple line phone adaptor that can be battery operated for an extended period of time and that has a sleep mode for reduced current drain when the adaptor is not in use.

A final object of the present invention is to provide a multiple line phone adaptor that can work on any phone network and that is compatible with existing features offered by phone companies.

The invention will be better understood by referring to the accompanying drawings in which:

DETAILED DESCRIPTION OF THE PREFERRED EMBODIMENT

The present invention is an adaptor that allows a single line DTMF phone to be connected to and use two or more separate phone lines. The present invention is discussed in the context of a two line phone adaptor, however the invention is not limited to connecting two separate phone lines to a single line phone as the invention encompasses connection of a single line phone to two or more phone lines. The adaptor can work in any phone network and is compatible with other services offered by the phone companies such as call waiting, conferencing and the like. The adaptor can be battery operated or it can run off of an AC adaptor.

Figure 1:
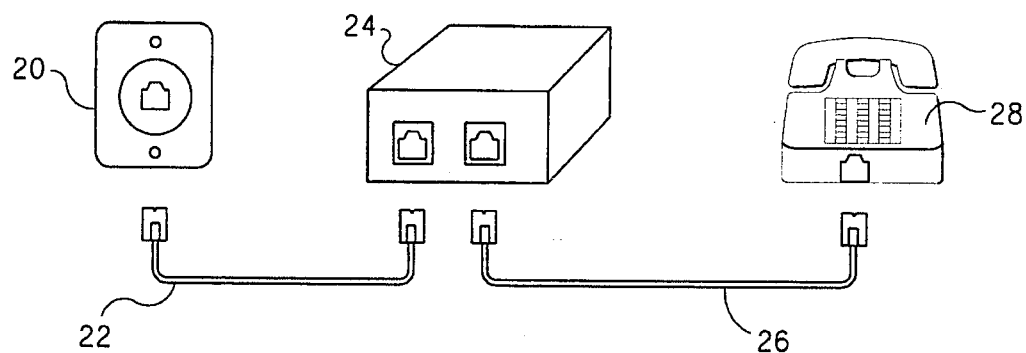
FIG. 1 shows the connection of a two line phone adaptor between a single line phone and a multi-line wall socket.

FIG. 1, shows the basic hook-up of the present invention. A two line wall socket 20 is connected via a four conductor phone jack 22 to the input side of the adaptor 24. The output of the adaptor 24 is connected via a two conductor phone jack 26 to a single line DTMF phone 28. As will be explained later, the phone 28 can make and receive calls on either of the phone lines provided by the two line wall socket 20.

Figure 2:
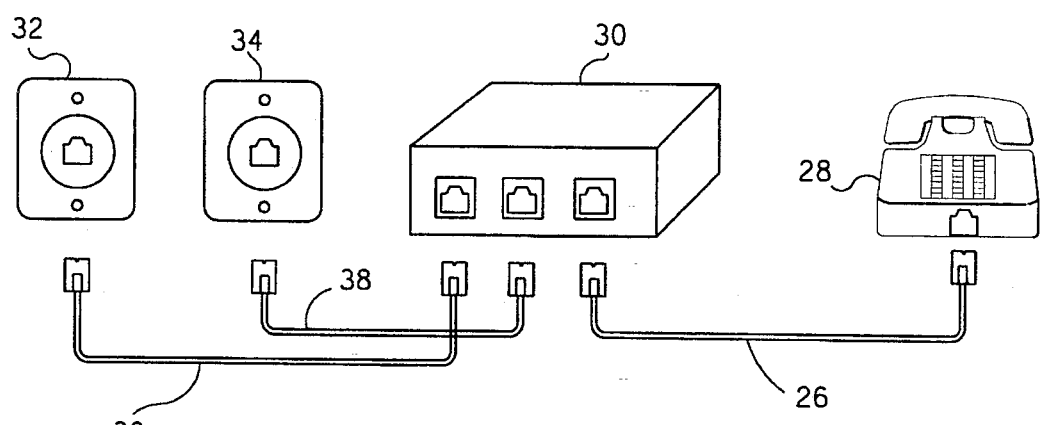
FIG. 2 shows the connection of a two line phone adaptor between a single line phone and two single line wall sockets.

FIG. 2 shows an alternate embodiment in which the adaptor 30 is connected to a set of single line wall sockets 32 and 34 via the two conductor lines 36 and 38 respectively. The hook-up between the adaptor 30 and the single line phone 28 is the same as shown in FIG. 1. The adaptor 30 functions identically to the adaptor shown in FIG. 1 except that it is connected to two single line wall sockets instead of one dual line wall socket.

Figure 3:
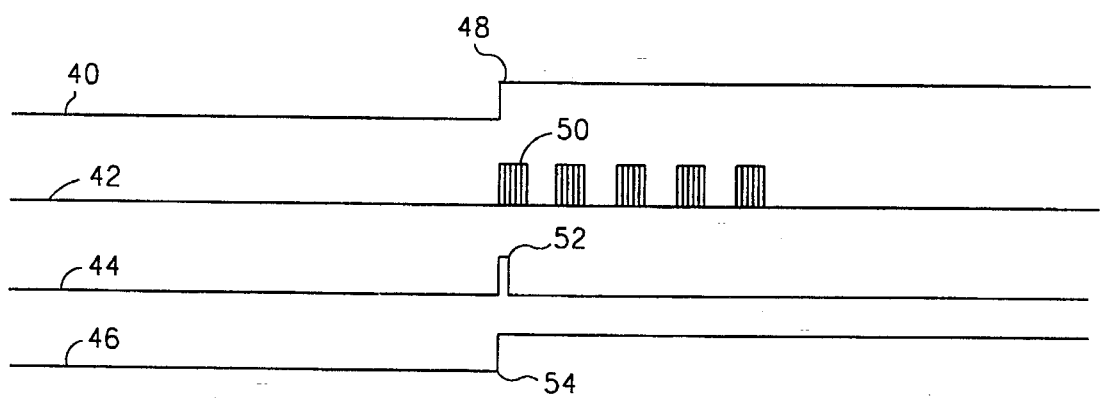
FIG. 3 is a wave form diagram showing the operation of the sleep function of the present invention.

FIG. 3 is a wave form diagram showing the sleep mode operation of the adaptor. The sleep mode allows the adaptor to conserve battery power when the phone is not in use. When the adaptor is in sleep mode, the adaptor 24 of FIG. 1 (adaptor 30 in FIG. 2) uses less than 50 uA. When the phone is in use and the adaptor is not in sleep mode, the adaptor 24 uses approximately 15 to 50 mA depending on which functions of the adaptor 24 are being used. Wave form 40 goes from low to high at point 48 if the phone is taken off the hook. This causes pulse 52 on wave form 44 which in turn causes wave form 46 to go from low to high at point 54. When 46 goes from low to high, the adaptor 24 'wakes up' and the adaptor is operational. Wave form 42 represents an incoming ring signal (from either line) which will also cause pulse 52 on wave form 44. Whenever there is a pulse 52 on wave form 44, the wave form 46 goes from low to high and 'wakes up' the adaptor 24. When a call is completed, wave form 46 goes from high to low and the adaptor 24 goes back into sleep mode. This sleep mode feature allows the adaptor to operate for several months on a single set of batteries.

Figure 4:
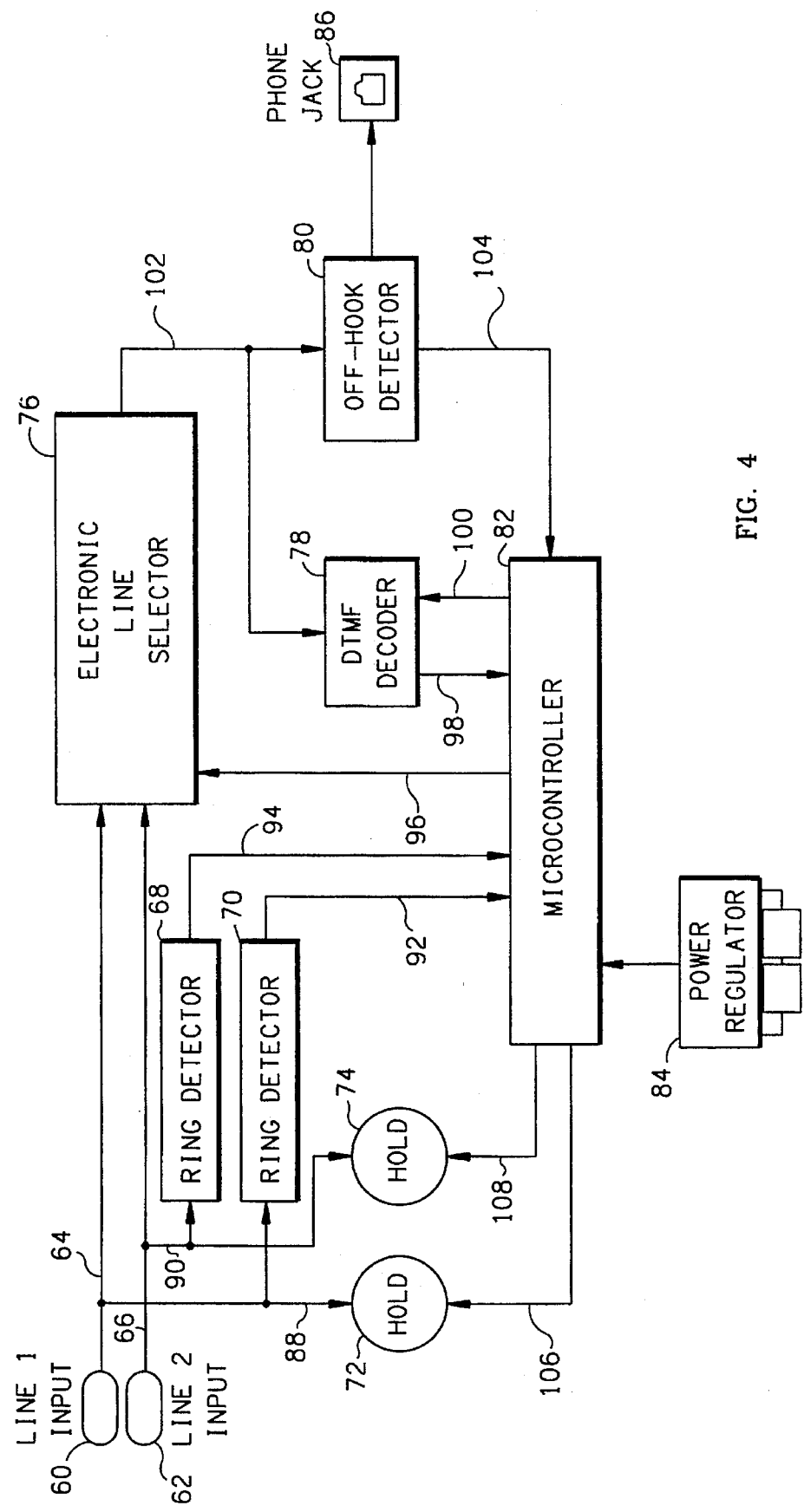
FIG. 4 is a block diagram of the present invention.

FIG. 4 is a block diagram of the system of the present invention. The block diagram comprises line one 60, line two 62, a first ring detector 70, a second ring detector 68, hold circuits 72 and 74, electronic line selector 76, DTMF decoder 78, off hook detector 80, phone jack 86, micro controller 82 and power regulator 84. Line one input 60 and line two input 62 correspond to the line inputs 36 and 38 shown in FIG. 2 (or dual line input 22 of FIG. 1). The line inputs 60 and 62 are connected to the electronic line selector 76 via lines 64 and 66 and to the ring detectors 70 and 68 and the hold circuits 72 and 74 via lines 88 and 90. The ring detectors 70 and 68 are connected to the micro controller 82 via lines 92 and 94 respectively. Hold circuits 72 and 74 are connected to the micro controller 82 via lines 106 and 108. The micro controller 82 is connected to the power regulator 84 and to the electronic line selector 76 via line 96. The DTMF decoder is connected to the Micro controller 82 via lines 98 and 100 and to the electronic line selector 76 via line 102. The off hook detector 80 is connected to the micro controller 82 via line 104 and to the electronic line selector 76 via line 102. The off hook detector 80 is connected to the external phone connector 86 which is in turn connected to the single line phone 28 shown in FIGS. 1 and 2. The micro controller 82 contains the software that controls the functions of the adaptor 24. The sleep software is also contained in the micro controller 82. When a line rings or when the single line phone is taken off the hook a wake signal is generated, as described with reference to FIG. 3, that turns on the micro processor and activates the functions of the two line adaptor 24 (FIG. 1). The operation of these functions will now be described with reference to FIG. 5.

Figure 5:
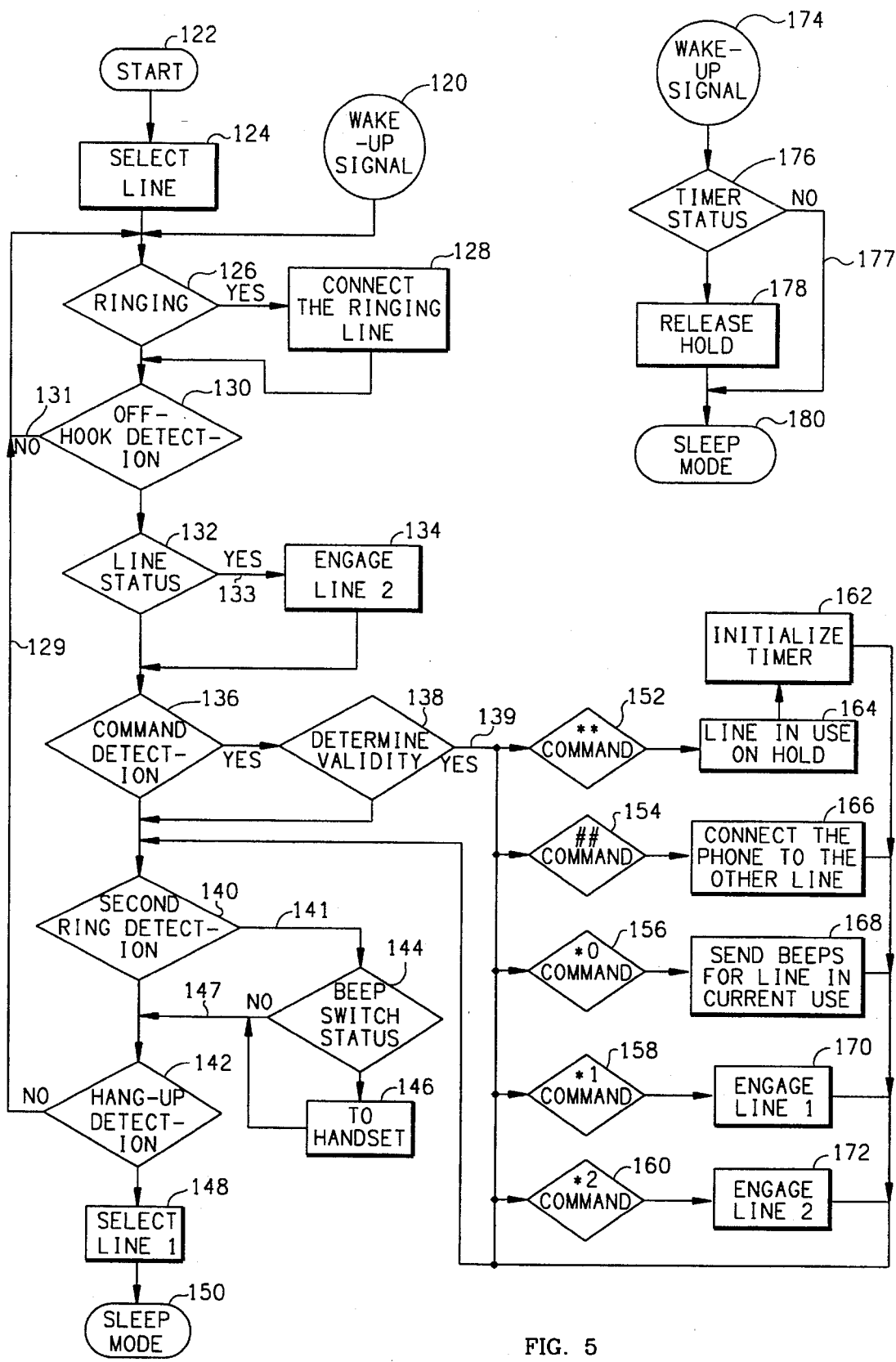
FIG. 5 is a software flow chart showing the operation of the present invention.
Figure 6A:
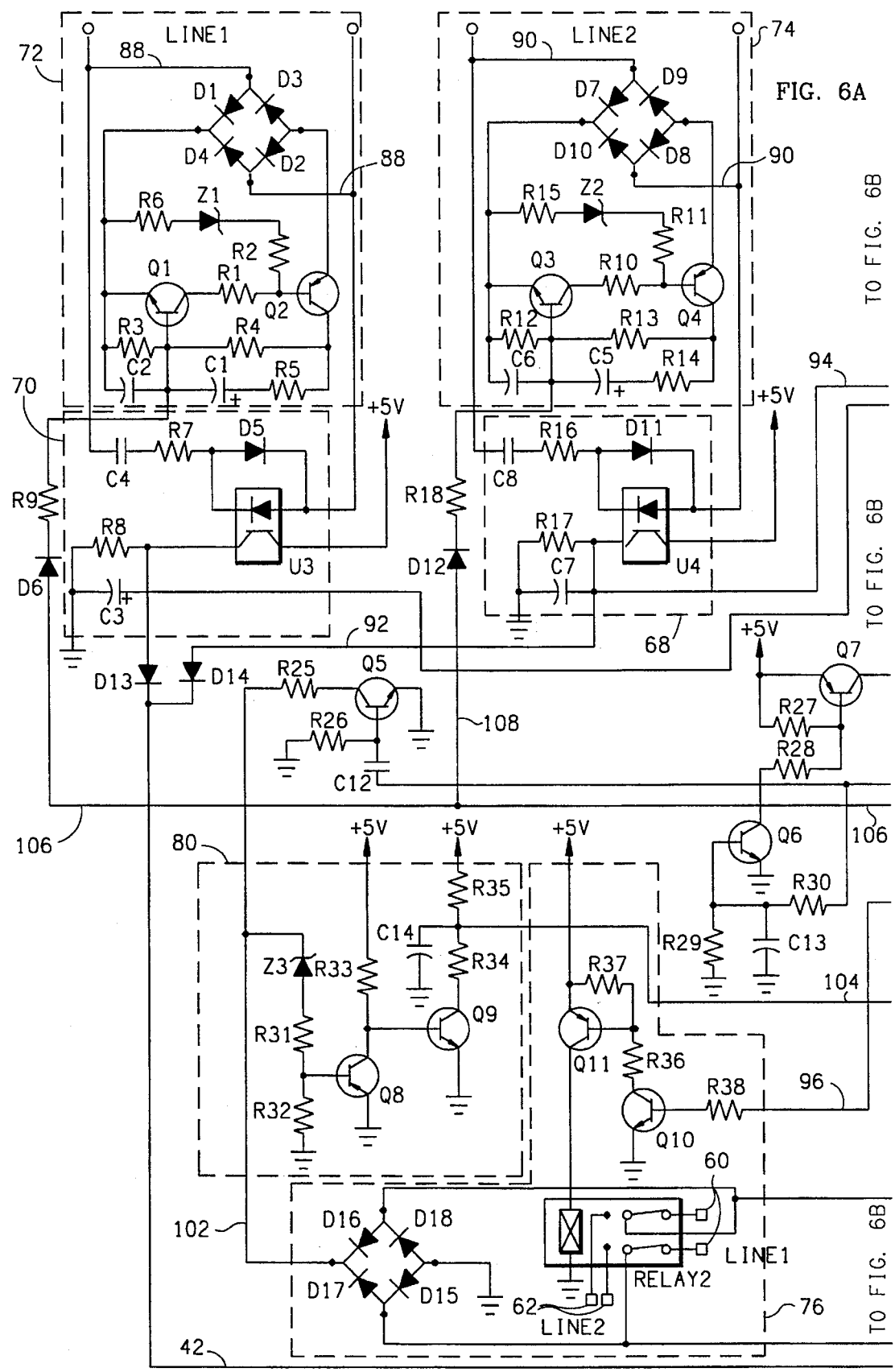
FIG. 6 is a detailed circuit diagram of the present invention.

FIG. 5 is a software flow chart showing the functional operation of the present invention. These functions can be accomplished by various circuitry an example of which is shown in FIG. 6. As previously described with reference to FIG. 3, a 'wake up' signal is generated when the phone is taken off the hook or when one of the two input lines rings. The 'wake up' signal is represented by block 120 in FIG. 5. This initializes the software routine in block 122. If the phone is taken off the hook then line one is selected in block 124. Any line can be selected, however, line one has been chosen as an example. If the input lines are ringing, then block 126 determines that one of the lines is ringing and block 128 connects to the ringing line. Block 130 determines if the phone is off the hook. If the phone is not off the hook, then via line 131, the system connects back to block 126 to determine if the line is still ringing. This circuit continues until the phone is answered. If the phone is off the hook, then block 132 determines if line one is in use. If line one is in use then, via line 133, block 134 engages line two and then connects to block 136. If line one is not in use, then block 132 connects directly to block 136. Block 136 determines if any commands are present. The commands include select line one, select line two, hold, switch to another line and identify the line in use. If no commands are present, then block 140 determines if another line is ringing. If a command is present, then block 138 determines if the command is valid. The sequence for a valid command will be discussed with respect to blocks 152 through 172.

Block 140 determines if another line is ringing. If another line is not ringing then block 142 determines if the phone has been hung up. If the phone has been hung up, block 148 selects line one and block 150 tells the system to go into sleep mode to conserve battery power. If block 140 determines that another line is ringing, then, via line 141, block 144 determines if the beep switch is on. If the beep switch is on then block 146 sends beeps to the hand set to let the user know that another line is ringing. If the beep switch is off then block 144 connects, via line 147, to block 142 which determines if the phone has been hung up. If the phone has not been hung up, then, via line 129, block 142 connects to block 126 to determine if any line is ringing.

Block 138 determines if there is a valid command present. If a valid command is present then block 138 connects via line 139 to blocks 152 through 160. Block 152 looks for the  command. If that command is present then block 164 is engaged to put the line in current use on hold. Each line has a green and red LED (not shown) associated with it. The green LED is on if the line is in use and off if the line is not in use. The red LED for each line is on if that line is on hold and is off if the line is not on hold. Another optional feature (not shown) is a Auto Hold Release that automatically releases the hold on a line if the phone has been hung up for more than 45 seconds. Block 154 looks for the ## command. If that command is present then block 166 is engaged to connect the phone to the other line. Block 156** looks for the *0 command. If this command is present, then block 168 is engaged to generate beeps corresponding to the line in current use. If line one is in use then block 168 generates one beep, and if line two is in use then block 168 generates two beeps. Block 158 looks for the command *1. If that command is present, then it is detected by block 158 which in turn activates block 170. Block 170 tells the system to engage line one. Block 160 looks for the command *2. If that command is present, then it is detected by block 160 which in turn activates block 172. Block 172 tells the system to engage line two.

When the hold command is initiated by the command , block 164 tells the system to hold the current line and it also activates block 162** which initializes a timer that is used to automatically release the hold after a certain period of time.

Blocks 174, 176, 178 and 180 show the function of the automatic release hold function. Once a line has been put on hold, block 174 generates a wake up signal every 90 mS. This signal goes to block 176 which determines if the time is up to release the hold. If the time is up, then a signal is sent to block 178 which caused the hold to be released. After the hold has been released, block 180 tells the hold circuitry and timer to go to sleep. If the time is not up to release the hold as determined in block 176, then block 176 sends a signal via line 177 to block 180 which in turn puts the hold circuitry to sleep until there is another wake up signal from block 174.

The discussion of FIG. 5 shows the functional operation of the adaptor 24 of the present invention. These functions can be implemented in various ways and the functional example shown should not be interpreted as a limitation on the claims.

FIG. 6 is a detailed circuit diagram of one embodiment of the present invention. The circuitry connections shown in FIG. 6 will now be discussed with respect to the hold circuitry, the ring detector circuitry, the DTMF decoder circuitry, the electronic line switch circuitry, the off hook detector circuitry, the micro controller and the sleep circuitry.

The hold circuitry for lines one and two are shown respectively in boxes 72 and 74 which correspond to the hold circuits 72 and 74 shown in FIG. 4. Hold circuit 72 is connected to line one via lines 88 and hold circuit 74 is connected to line two via lines 90. Lines 106 and 108 respectively connect hold circuits 72 and 74 to the micro controller 82. The transistor pair shown in hold circuit 72 are connected as a latch. The latch will be triggered on whenever the micro controller sends out a signal on line 106 and the line is in use. To release the hold there must be a drop in voltage on the phone line caused by the additional loading of a parallel phone being connected in parallel (the parallel connected phone is off the hook) to the same phone line or power source. This causes the latch to be biased off. Hold circuits 72 and 74 operate in the same manner.

The ring detectors shown in boxes 70 and 68 are connected to the lines one and two respectively via the lines 88 and 90. The ring detectors are connected to the micro controller 82 via the lines 92 and 94. These connections are the same as shown in FIG. 4. Whenever there is a ring on one of the lines, a signal is sent on either line 92 or 94 to the micro controller 82 for processing according to the software flow chart shown in FIG. 5.

The DTMF decoder connection circuitry is shown in box 78. The decoder 78 is shown connected to the micro controller 82 via lines 97, 98, 99 and 100. The decoder 78 is a KA3170 that is made by Samsung. The power supply of the decoder 78 is controlled by the micro controller 82 and will only be turned on when the attached phone is picked up.

The electronic line selector is shown in box 76. A signal is sent on line 96 from the micro controller 82 to the line selector 76 which causes the line selector 76 to select either line one or line two for connection to the single line phone 28 of FIG. 1. Line one is connected to lines 60 and line two is connected to the lines 62.

The circuitry for the off hook detector is shown in box 80. When the off hook detector 80 receives an off hook signal on line 102, it sends that signal to the micro controller via line 104 for processing according to the software flow chart shown in FIG. 5.

The micro controller 82 is an 8 bit controller (Part No. MC78C05K1) made by Motorola. It is connected to the other circuits as shown in FIG. 6 and operates according to the software flow chart shown in FIG. 5.

Finally, box 200 shows the 'wake up' circuitry, the function of which was previously explained with reference to FIG. 3. When the phone 26 is taken off the hook, a signal is generated on line 40 that is transferred to the micro controller 82. The micro controller then 'wakes up' the circuitry in preparation for processing a call. Similarly, when either line one or line two rings, a ring signal is generated on line 42 that is transferred by the wake up circuitry 200 to the micro controller 82 that will then wake up the circuitry so that the call can be processed.

While the adaptor of the present invention is shown with reference to FIGS. 1 through 6, the instant invention is not limited to the exact circuitry and software shown herein, for obvious modifications can be made by a person skilled in the art.

What is claimed is:

1. A multiple line phone adaptor for connection of at least two separate phone lines to a single line phone comprising:

first and second ring detector means for connection respectively to first and second phone lines, micro controller means connected to said first and second ring detector means, first and second hold means connected respectively to said first and second phone lines and each hold means connected to said micro controller means;

electronic line selector means for connection to said first and second phone lines, said selector means being connected to said micro controller means and said micro controller means controlling the selection of said first and second phone lines;

off hook detector means for detecting when said single line phone is taken off the hook, and DTMF decoder means connected to said micro controller means and for connection to said single line phone for decoding DTMF command signals from said single line phone.

2. The phone adaptor of claim 1 wherein:

said single line phone can control the micro controller means by generating DTMF signals for selection of said first and second phone lines.

3. The phone adaptor of claim 1 wherein:

said single line phone can control the micro controller means by generating DTMF signals for causing one or both of said first and second phone lines to be placed on hold.

4. The phone adaptor of claim 1 wherein:

said single line phone can control the micro controller means by generating DTMF signals for causing both said first and second phone lines to be in use at the same time.

5. The phone adaptor of claim 1 including:

sleep means connected to said micro controller means for detecting when there are no signals on the phone lines and when the phone is on the hook and signaling said micro controller means to go into sleep mode.

6. The phone adaptor of claim 1 wherein:

said single line phone can control the micro controller means by generating DTMF signals for selection of said first and said second phone lines, said single line phone can control the micro controller means by generating DTMF signals for causing one or both of said first and second phone lines to be placed on hold, and said single line phone can control the micro controller means by generating DTMF signals for causing both said first and second phone lines to be in use at the same time.

7. The phone adaptor of claim 6 including:

sleep means connected to said micro controller means for detecting when there are no signals on the phone lines and when the phone is on the hook and signaling said micro controller means to go into sleep mode.

8. A multiple line phone adaptor for connection of at least two separate phone lines to a single line phone comprising:

multiple line ring detector means for connection respectively to multiple phone lines, micro controller means connected to said multiple line ring detector means, multiple line hold means connected respectively to said multiple phone lines and to said micro controller means;

electronic line selector means for connection to said multiple phone lines, said selector means being connected to said micro controller means and said micro controller means controlling the selection of said multiple phone lines;

off hook detector means for detecting when said single line phone is taken off the hook, and DTMF decoder means connected to said micro controller means and for connection to said single line phone for decoding DTMF command signals from said single line phone.

9. The phone adaptor of claim 8 wherein:

said single line phone can control the micro controller means by generating DTMF signals for selection of said multiple phone lines.

10. The phone adaptor of claim 8 wherein:

said single line phone can control the micro controller means by generating DTMF signals for causing one or more of said multiple phone lines to be placed on hold.

11. The phone adaptor of claim 8 wherein:

said single line phone can control the micro controller means by generating DTMF signals for causing both said multiple phone lines to be in use at the same time.

12. The phone adaptor of claim 8 including:

sleep means connected to said micro controller means for detecting when there are no signals on the phone lines and when the phone is on the hook and signaling said micro controller means to go into sleep mode.

13. The phone adaptor of claim 8 wherein:

said single line phone can control the micro controller means by generating DTMF signals for selection of said multiple phone line, said single line phone can control the micro controller means by generating DTMF signals for causing one or more of said multiple phone lines to be placed on hold, and said single line phone can control the micro controller means by generating DTMF signals for causing more than one of said multiple phone lines to be in use at the same time.

14. The phone adaptor of claim 13 including:

sleep means connected to said micro controller means for detecting when there are no signals on the phone lines and when the phone is on the hook and signaling said micro controller means to go into sleep mode.

\* \* \* \* \*